United States Patent
Graydon et al.

(10) Patent No.: US 9,849,537 B2
(45) Date of Patent: Dec. 26, 2017

(54) METHODS FOR WELD PURGING

(75) Inventors: Glen Graydon, Llanelli (GB); Walter Mark Veldsman, Guildford (GB)

(73) Assignee: Linde Aktiengesellschaft, Munich (DE)

( * ) Notice: Subject to any disclaimer, the term of this patent is extended or adjusted under 35 U.S.C. 154(b) by 1487 days.

(21) Appl. No.: 13/233,166

(22) Filed: Sep. 15, 2011

(65) Prior Publication Data

US 2013/0068730 A1 Mar. 21, 2013

(51) Int. Cl.
*B23K 9/32* (2006.01)
*B23K 9/028* (2006.01)
*B23K 35/38* (2006.01)
*F16L 13/02* (2006.01)
*B23K 101/06* (2006.01)
*B23K 101/12* (2006.01)

(52) U.S. Cl.
CPC ............ *B23K 9/326* (2013.01); *B23K 9/0282* (2013.01); *B23K 9/32* (2013.01); *B23K 35/383* (2013.01); *F16L 13/02* (2013.01); *B23K 2201/06* (2013.01); *B23K 2201/12* (2013.01); *Y10T 137/0318* (2015.04)

(58) Field of Classification Search
CPC ........ B23K 9/291; B23K 9/296; B23K 9/285; B23K 9/167; H05H 1/34
USPC .............. 219/60, 60.2, 61, 72, 73, 73.2, 74, 219/130.01–130.51, 136, 137 R, 137 WM, 219/137.2, 137.7, 137.71
See application file for complete search history.

(56) References Cited

U.S. PATENT DOCUMENTS 5,958,267 A * 9/1999 Lingenfelter et al. ... 219/121.63
7,067,759 B2 * 6/2006 Gabzdyl .................. 219/74

* cited by examiner

*Primary Examiner* — Tu B Hoang
*Assistant Examiner* — Thomas Ward
(74) *Attorney, Agent, or Firm* — Philip H. Von Neida

(57) ABSTRACT

A method for purging air from a structure to be joined by welding by feeding a liquid cryogen to the structure. The liquid cryogen will enter the structure, warm up and enter the gaseous phase very rapidly. The gaseous cryogen will displace the air that is present in the structure out of the structure and reduce the content of oxygen in the structure to about 10 parts per million when welding can begin.

10 Claims, 5 Drawing Sheets

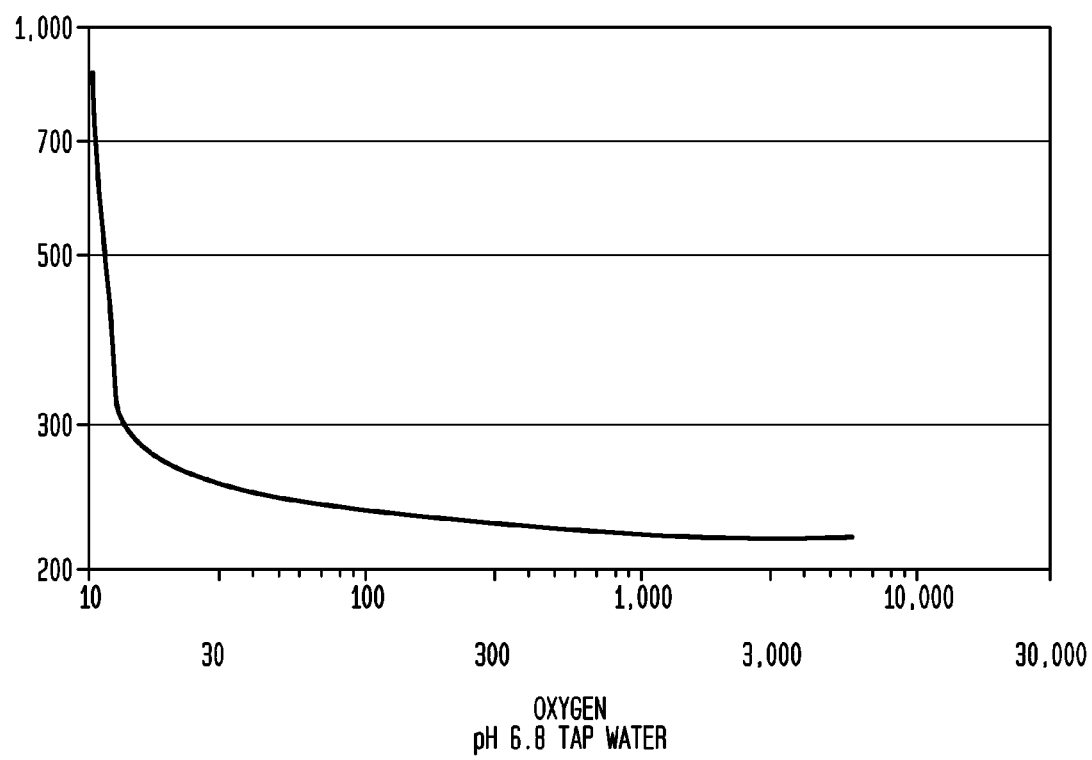

METHODS FOR WELD PURGING

BACKGROUND OF THE INVENTION

During welding operations, it is often necessary to protect the root of the weld from oxidation as this can lead to weld defects and a reduction in corrosion resistance. This is particularly the case in creep resistant materials, alloy steels, stainless steels and its alloys, nickel and its alloys, and titanium and its alloys. The usual method of protecting the area to be welded is to purge it usually by passing a stream of an inert gas such as argon over the weld area. This limits the availability of oxygen at the weld root to cause oxidation.

However, there are a number of factors which may affect the efficiency of the process and the quality of the weld produced. These factors include the method of damming, the oxygen content of the purge gas and the purge flowrate, all of which can affect the service life of the welded component.

Purging is commonly required when gas tungsten arc welding (GTAW) or plasma processes are used, particularly when stainless steel and alloy steels, nimonics and reactive metals such as titanium or zirconium are being joined.

A common application area is for root runs in circumferential welds in pipe. For pipelines used in the production of electronic components, there is also a requirement to ensure the absence of particles, particularly oxides formed during welding operations.

For steel and nickel alloys, inadequate protection of the rear face of the weld will lead to heavy oxidation and poor penetration bead shape and low corrosion resistance as shown in FIG. 5 (Pitting corrosion potential graph). Further there will be discoloration in the reactive metals and embrittlement.

The problem to be solved is the extended length of time that is needed for oxygen concentration to be reduced from 200,000 ppm to about 10 ppm. The nature of the purging process follows a mathematical power curve of the form $Y=AX^{-b}$. The nature of this curve is such that the tail of the curve is very long, leading to extended times for reducing the oxygen concentration from 200 ppm to 10 ppm. This time period is controlled by the diffusion mechanism and cannot appreciably be reduced significantly. This time period is dead time for fabricators and manufacturers as no production can continue until the 10 ppm level is reached.

The instant invention reduces this waiting time and utilizes the rapid expansion of liquid cryogenic gases from the liquid phase to the gas phase. The rapid expansion from the liquid to the gaseous state displaces air that is present inside a vessel or pipe to be purged, thereby replacing the air and oxygen present therein with the chosen inert cryogen gas.

SUMMARY OF THE INVENTION

In one embodiment of the invention, there is disclosed a method for purging air from a structure to be welded comprising feeding a liquid cryogen to said structure wherein said liquid cryogen will expand to a gaseous state and displace said air in said structure.

The structure that is to be welded is typically a pipe or vessel that is capable of entraining air. The liquid cryogen which is selected from the group consisting of argon, helium and nitrogen and mixtures thereof is added to the weld joint between the structure to be welded and the structure it is welded to. As the liquid cryogen warms up inside the structure, it will rapidly enter the gaseous phase and expand. This expansion will force air that is entrained in the structure to be welded out of the structure such as in the case of a pipe, the opposite end from the position that is being welded. This will reduce the oxygen content at the weld joint to about 10 ppm and will do so in a significantly shorter period of time than if traditional purging methods had been employed. The welding operation may commence at this point with the lower oxygen levels present.

The concentration of oxygen in the structure to be welded may be monitored by conventional means such as oxygen meters or oxygen concentration monitors. By measuring the level of reduction of oxygen in the structure to be welded, the welder/fabricator will know when to begin welding.

In another embodiment of the invention, there is disclosed a method for welding a structure comprising feeding a liquid cryogen to said structure and allowing said liquid cryogen to expand to the gaseous state thereby displacing air present in said structure.

The structure is typically a pipe or vessel that is capable of entraining air and having at least one open end to allow the escape of gas. The liquid cryogen which is selected from the group consisting of argon, helium and nitrogen and mixtures thereof is added to the weld joint between the structure to be welded and the structure it is welded to. Welding may begin when a lower level of oxygen present in the structure to be welded is measured.

BRIEF DESCRIPTION OF THE DRAWINGS

FIG. 5 is a graph showing the effects of oxygen levels versus pitting corrosion potential.

DETAILED DESCRIPTION OF THE INVENTION

Figure 1:
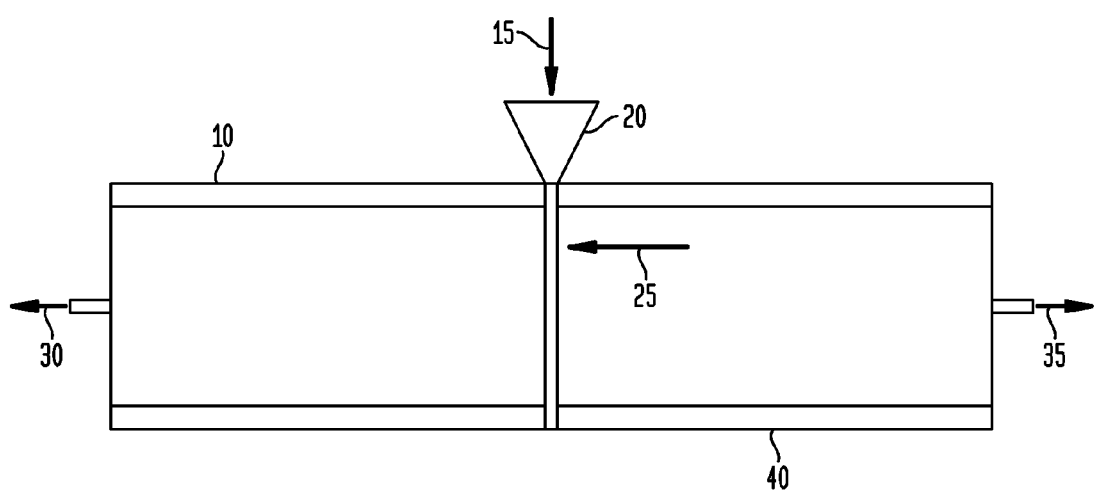
FIG. 1 is a representation of a structure to be welded using liquid cryogen to displace air from the structure.

In FIG. 1, there is disclosed a structure to be welded according to the methods of the invention. This structure 10 can be a pipe or vessel that contains an empty space that is capable of entraining air. The structure 10 can be welded to an adjacent structure 40 which can be likewise in design (i.e., pipe to pipe fitting). The structure 10 to be welded can be any material that is capable of being welded, for example a material selected from the group consisting of creep resistant materials, alloy steels, stainless steel, nickel, titanium, zirconium and all their respective alloys.

The structure 10 to be joined with adjacent structure 40 can be joined by a variety of welding and joining means selected from the group consisting of GTAW (Gas Tungsten Arc Welding), PAW (Plasma Arc welding), GMAW (Gas Metal Arc Welding), Laser Welding and other suitable welding processes.

The weld joint 25 is the place where one end of structure 10 is joined with one end of structure 40 and is where the welding operation takes place. Liquid inlet 15 contacts the weld joint through a filling means 20 such as a funnel. The liquid inlet 15 will allow liquid cryogen selected from the group consisting of argon, helium, nitrogen and mixtures thereof to enter the structure 10. The liquid cryogen will be fed to the structure 10 at typical ambient temperatures. As the liquid cryogen warms up inside the structure, it will convert to the gaseous phase and begin to expand. As the liquid cryogen expands to a gas, it will force the air that is already present in the structure 10 and the adjoining structure 40 out their ends 30 and 35 respectively. Typically this expansion of gas will result in oxygen content inside the structure 10 being reduced from around 200,000 ppm to about 10 ppm.

The amount of liquid cryogen employed depends upon the size and volume of the structure to be joined as well as the liquid cryogen itself. Typically this amount ranges from 0.25 of liquid liter to 5 liters depending on how large the pipe or vessel volume is and this amount is fed into the system for an amount of time necessary to allow the requisite amount of liquid cryogen to enter the structure.

Once the appropriate oxygen level has been reached, welding of the structure can commence. In order to maintain this level of oxygen, purging with a purge gas selected from the group consisting of Argon, Nitrogen, and Nitrogen and Hydrogen mixtures, should be performed at about 10 to 20 liters per minute of purge gas during the length of the welding operation.

Figure 2:
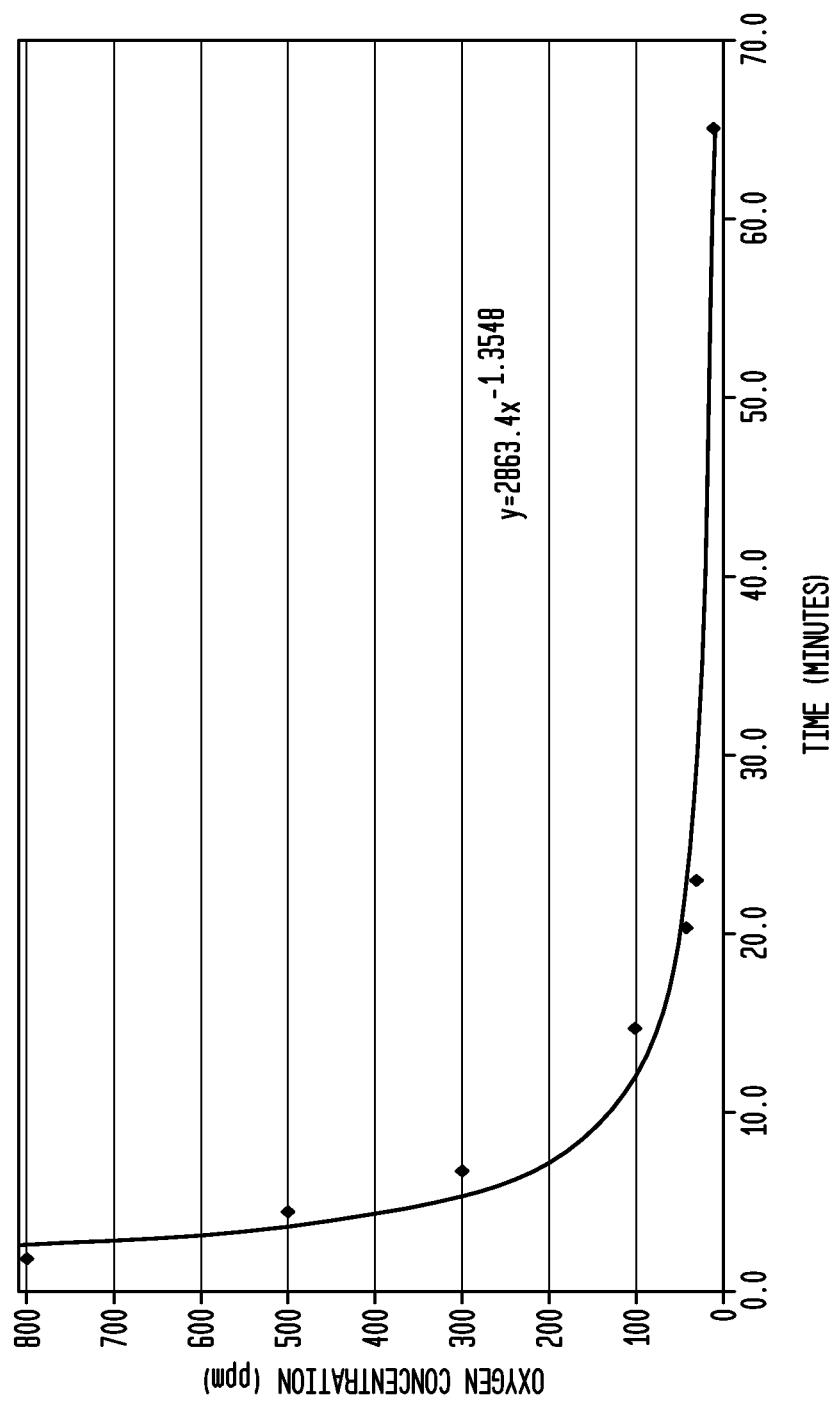
FIG. 2 is a graph showing oxygen amounts versus time for a traditional purging operation.

FIG. 2 is a graph showing the concentration of oxygen versus time for a typical purging process. The structure to be purged was a 2205 Duplex Stainless Steel Vessel having a diameter of 460 mm and 1000 mm length. This normal gas purging utilized Argon as the purge gas and consisted of directing the purge gas through the pipe until the requisite oxygen concentration is reached. As noted earlier, the nature of the purging process follows a mathematical power curve of the form $Y=AX^{-b}$. The nature of this curve is such that the tail of the curve is very long, leading to extended times for reducing the oxygen concentration from 200,000 ppm to about 10 ppm. As seen in FIG. 2, the normal gas purging had a formula $Y=2863.4X^{-1.3548}$ and took 65 minutes at a flow rate of 45 liters per minute to reach a 10 ppm oxygen level inside the vessel.

Figure 3:
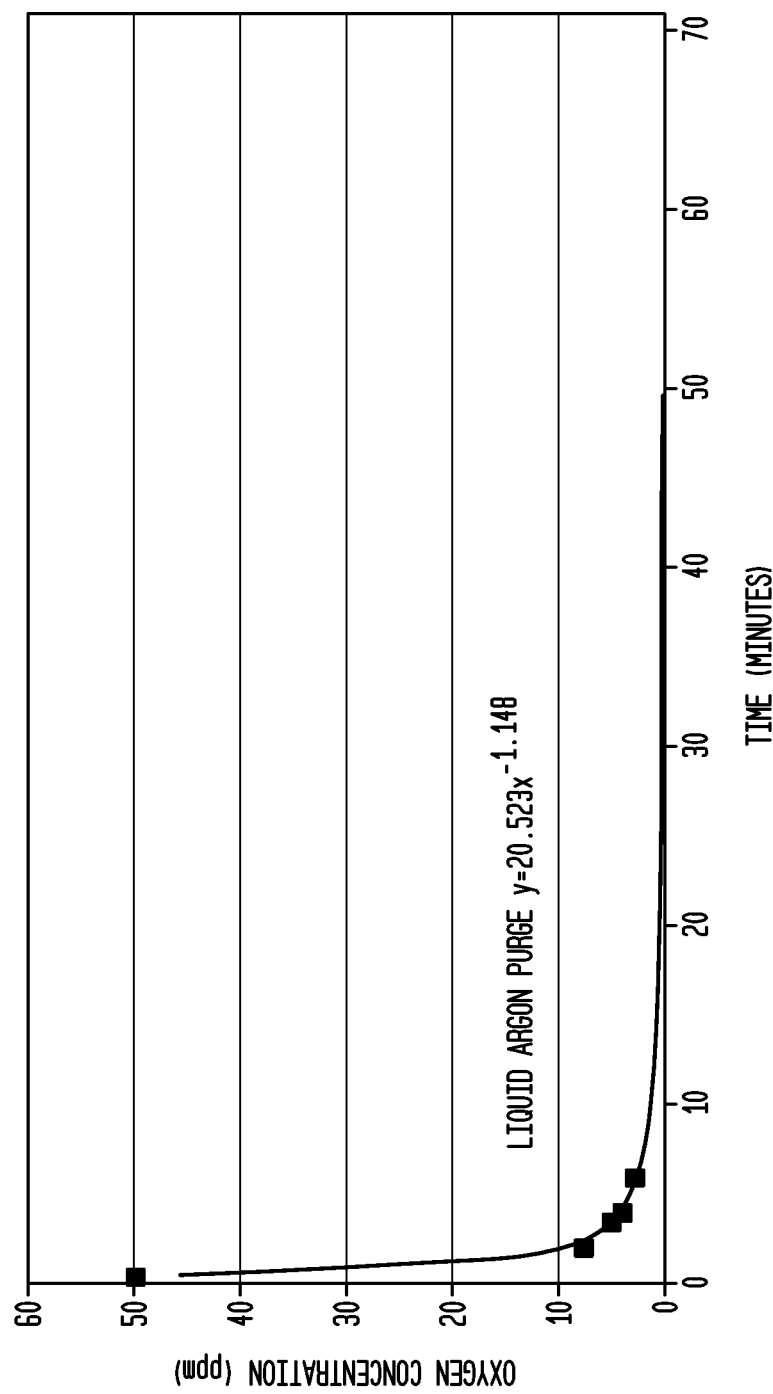
FIG. 3. is a graph showing oxygen amounts versus time for the inventive purging operation.

In FIG. 3, the same vessel as in FIG. 2 was purged of gas using the inventive method and liquid argon. The power curve formula was $Y=20.523X^{-1.148}$ and it can be seen that with the liquid argon being fed into the stainless steel vessel that it took 1 minute and 50 seconds to reach a 10 ppm oxygen level inside the vessel. This is a significant time savings versus the 65 minutes it took using the traditional purging method.

Figure 4:
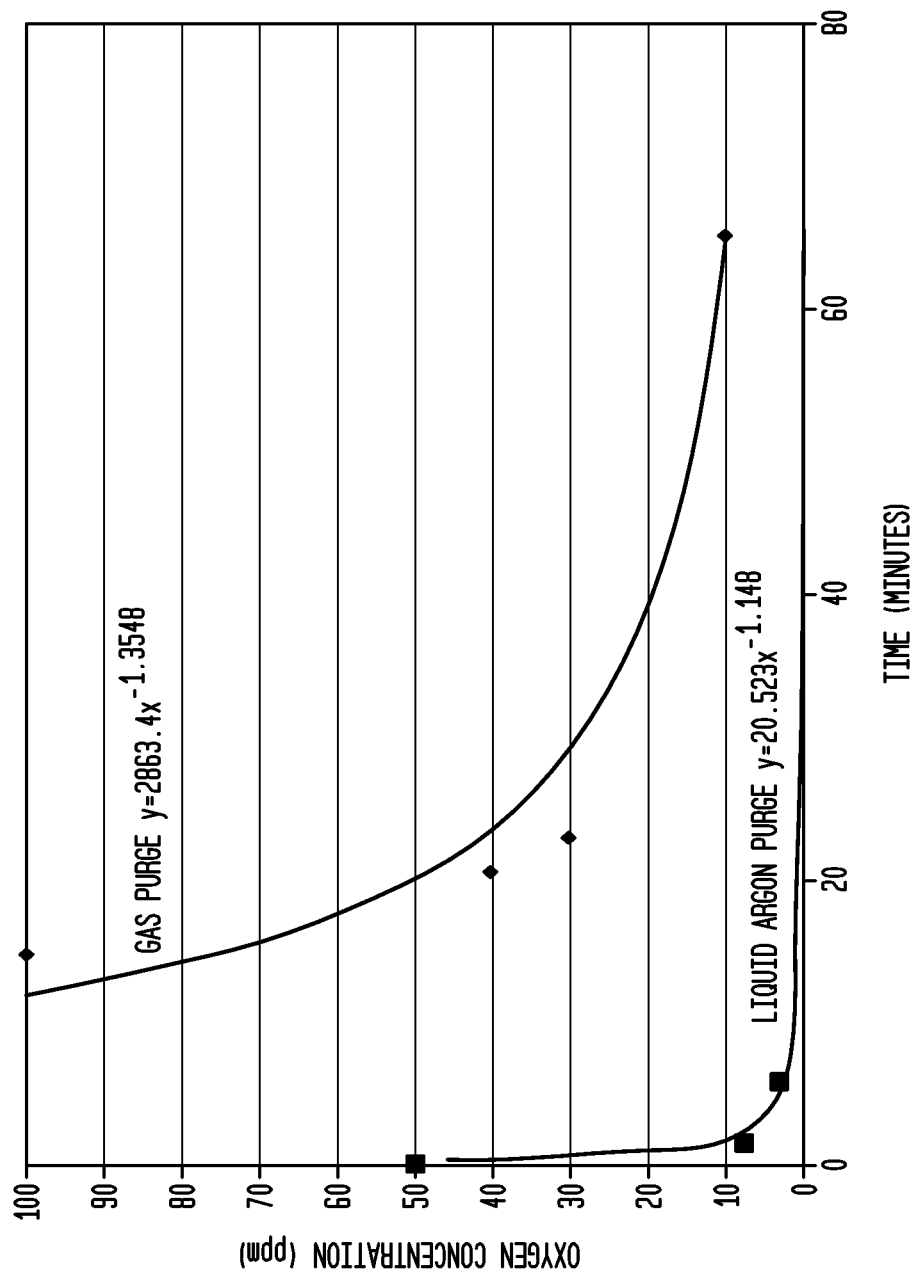
FIG. 4 is a graph showing oxygen concentration versus time for a regular gas purge and the inventive method.

FIG. 4 is a graph showing the differences between the gas purging method as described in FIG. 2 and the inventive method using a liquid cryogen as described in FIG. 3. The normal gas purging process took 65 minutes to reach 10 ppm oxygen level while the inventive process was able to reach this oxygen concentration in 1 minute and 50 seconds.

FIG. 5 is a graph showing the effect of purge gas oxygen levels on pitting corrosion potential in millivolts. As noted in FIG. 5, the less oxygen present in a system, the higher the pitting corrosion potential is. Consequently, the higher pitting corrosion potential equates to higher corrosion resistance, therefore corrosion resistance is improved by purging oxygen from the vessel to be joined, While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for purging air from inside a structure that is capable of entraining air to be welded and prior to commencing welding operations comprising feeding a liquid cryogen selected from the group consisting of argon, helium, nitrogen, and mixtures thereof to the inside of said structure wherein said liquid cryogen will expand to a gaseous state and displace said air from the inside of said structure out of said structure wherein the concentration of oxygen in the inside of said structure where the oxygen is measured is about 10 parts per million after said air is displaced out of said structure.

2. The method as claimed in claim 1 wherein said structure to be welded is selected from the group consisting of a vessel and a pipe.

3. The method as claimed in claim 2 wherein said structure is made of a material selected from the group consisting of creep resistant materials, alloy steels, stainless steel, nickel, titanium, zirconium and their respective alloys.

4. The method as claimed in claim 1 wherein said liquid cryogen is added to a weld joint of said structure to be welded thereby permitting the liquid cryogen to enter the structure.

5. The method as claimed in claim 1 wherein said liquid cryogen is fed to said structure at ambient temperature.

6. The method as claimed in claim 1 wherein said structure to be welded is welded by a process selected from the group consisting of Gas Tungsten Arc Welding, Plasma Arc Welding, Gas Metal Arc Welding, and Laser Welding.

7. The method as claimed in claim 1 wherein oxygen concentration is measured with an oxygen meter or an oxygen concentration monitor.

8. The method as claimed in claim 1 wherein said displaced air exits through an open end of said structure.

9. The method as claimed in claim 1 wherein said liquid cryogen is fed to said structure in an amount ranging from about 0.25 liquid liters to about 5 liquid liters.

10. The method as claimed in claim 1 further comprising purging said structure with a purge gas selected from the group consisting of Argon, Nitrogen and Nitrogen and Hydrogen mixtures after said air is purged from said structure.

* * * * *